(12) United States Patent
Dew et al.

(10) Patent No.: US 6,582,494 B1
(45) Date of Patent: Jun. 24, 2003

(54) RECOVERY OF NICKEL AND COPPER FROM SULPHIDE CONCENTRATES BY BIOLEACHING

(75) Inventors: David William Dew, Randburg (ZA); Deborah Maxine Miller, Johannesburg (ZA)

(73) Assignee: Billiton Intellectual Property, B.V., The Hague (NL)

( * ) Notice: Subject to any disclaimer, the term of this patent is extended or adjusted under 35 U.S.C. 154(b) by 0 days.

(21) Appl. No.: 10/069,958

(22) PCT Filed: Sep. 6, 2000

(86) PCT No.: PCT/ZA00/00164

§ 371 (c)(1),
(2), (4) Date: Jul. 19, 2002

(87) PCT Pub. No.: WO01/18270

PCT Pub. Date: Mar. 15, 2001

(30) Foreign Application Priority Data

Sep. 9, 1999 (ZA) .................................................. 99/5795

(51) Int. Cl.[7] .......................... C22B 3/18; C22B 15/00
(52) U.S. Cl. ........................ 75/721; 75/744; 423/150.4; 423/27
(58) Field of Search ................ 75/743, 744; 423/150.4, 423/27

(56) References Cited

U.S. PATENT DOCUMENTS

| 5,626,648 A | 5/1997 | Duyvesteyn et al. |
| 5,919,674 A | 7/1999 | Tunley |
| 6,245,125 B1 * | 6/2001 | Dew et al. .................. 205/583 |
| H2005 H * | 11/2001 | Winby et al. ................. 423/27 |

FOREIGN PATENT DOCUMENTS

| JP | 56030500 A | 3/1981 | |
| SU | 1742346 A1 | 6/1992 | |
| WO | WO 9909226 A1 * | 2/1999 | ........... C22B/23/00 |
| WO | WO 00/23629 | 4/2000 | |
| ZA | 79/5520 | 10/1979 | |

OTHER PUBLICATIONS

Chakraborti, Nirumpam, "Kinetics of Leaching Chalcopyrite–Bearing Waste Rock with Thermophillic and Mesophilic Bacteria", Hydrometallurgy, 5th Ed., Elsevier Scientific Publishing Company (Amsterdam), p. 337–354, (1980).*

* cited by examiner

*Primary Examiner*—Roy King
*Assistant Examiner*—Andrew Wessman

(57) ABSTRACT

A process for recovering nickel and copper from a concentrate which includes the steps of subjecting the concentrate to a treatment phase to produce a first leach solution which contains predominantly copper and a second leach solution which contains predominantly nickel, subjecting the first leach solution to a process for copper recovery which includes a solvent extraction step to produce a raffinate which is high in sulphuric acid, recycling at least a portion of the raffinate to the aforementioned treatment phase and subjecting the second leach solution to a process for nickel.

7 Claims, 2 Drawing Sheets

RECOVERY OF NICKEL AND COPPER FROM SULPHIDE CONCENTRATES BY BIOLEACHING

BACKGROUND OF THE INVENTION

This invention relates to the recovery of nickel and copper from concentrates which contain minerals of both metals.

The specification of South African patent No. 98/2549 describes a process for the recovery of copper which includes the following steps:

(a) biologically oxidising copper sulphate concentrate in slurry form to dissolve copper as soluble copper sulphate;

(b) subjecting the slurry to solid/liquid separation to produce a solution with a high copper concentration;

(c) treating the solution with a solvent extraction reagent so that copper ions are exchanged by the reagent for hydrogen ions to produce a raffinate which is high in sulphuric acid and low in copper sulphate;

(d) stripping the solvent extraction reagent with a sulphuric acid solution;

(e) electrowinning copper from the sulphuric acid solution; and (f) using at least a portion of the raffinate from step (c) in step (a).

An important feature of this process is the application of biologically assisted leaching of copper concentrates with the use of a portion of the raffinate produced by solvent extraction to satisfy the demand for acid in the leaching step.

SUMMARY OF THE INVENTION

The present invention is concerned with the recovery of nickel and copper from a concentrate which contains a substantial amount of nickel.

The invention provides a process for recovering nickel and copper from a concentrate which includes the steps of:

(a) subjecting the concentrate to a treatment phase to produce:
  (1) a first leach solution which contains predominantly copper and
  (2) a second leach solution which contains predominantly nickel;

(b) subjecting the first leach solution to a process for copper recovery which includes a solvent extraction step to produce a raffinate which is high in sulphuric acid;

(c) recycling at least a portion of the raffinate to the treatment phase of step (a), and (d) subjecting the second leach solution to a process for nickel recovery.

In one form of the invention the treatment phase of step (a) includes the steps of:

(e) separating the concentrate by flotation into a first concentrate which is substantially a copper concentrate and a second concentrate which is substantially a nickel concentrate;

(f) biologically oxidising the first concentrate to produce the said first leach solution, and (g) biologically oxidising the second concentrate to produce the said second leach solution.

With this form of the invention the raffinate produced in step (b) is recycled at least to the oxidation step (f). The raffinate may, depending on the conditions, also be recycled to the oxidation step (g).

The process of step (d) may include a step of solvent extraction to extract copper from the second leach solution before nickel is recovered from the second leach solution.

Preferably step (f) is carried out at an elevated temperature, eg. from 65° C. to 80° C., so that thermophilic archaea such as Sulfolobus are active and chalcopyrite is thereby dissolved by biological oxidation.

In a second form of the invention the treatment phase of step (a) includes the steps of subjecting the concentrate in series:

(h) to a first biological oxidation step to dissolve nickel as nickel sulphate in the said second leach liquor, and (i) to a second biological oxidation step to dissolve copper as copper sulphate in the said first leach liquor.

In step (h) the oxidation may be conducted at a moderate temperature, of the order of from 40° C. to 45° C., to dissolve pentlandite as nickel sulphate, with use being made of mesophilic, or moderate thermotolerant, bacteria.

In step (i) the oxidation may be conducted at a relatively elevated temperature, of the order of 70° C. to 80° C., to dissolve chalcopyrite as copper sulphate, with use being made of thermotolerant or thermophilic bacteria or archaea, such as the type Sulfolobus.

In each case solid/liquid separation is used to obtain a solution.

The nickel sulphate may be subjected to solvent extraction for copper, before nickel recovery takes place.

The copper sulphate is subjected to solvent extraction for copper, thereby producing the said raffinate which is high in sulphuric acid and which is recycled to at least one of the oxidation steps.

BRIEF DESCRIPTION OF THE DRAWINGS

The invention is further described by way of examples with reference to the accompanying drawings, FIGS. 1 and 2, which respectively illustrate different embodiments of the invention.

DESCRIPTION OF PREFERRED EMBODIMENTS

Figure 1:
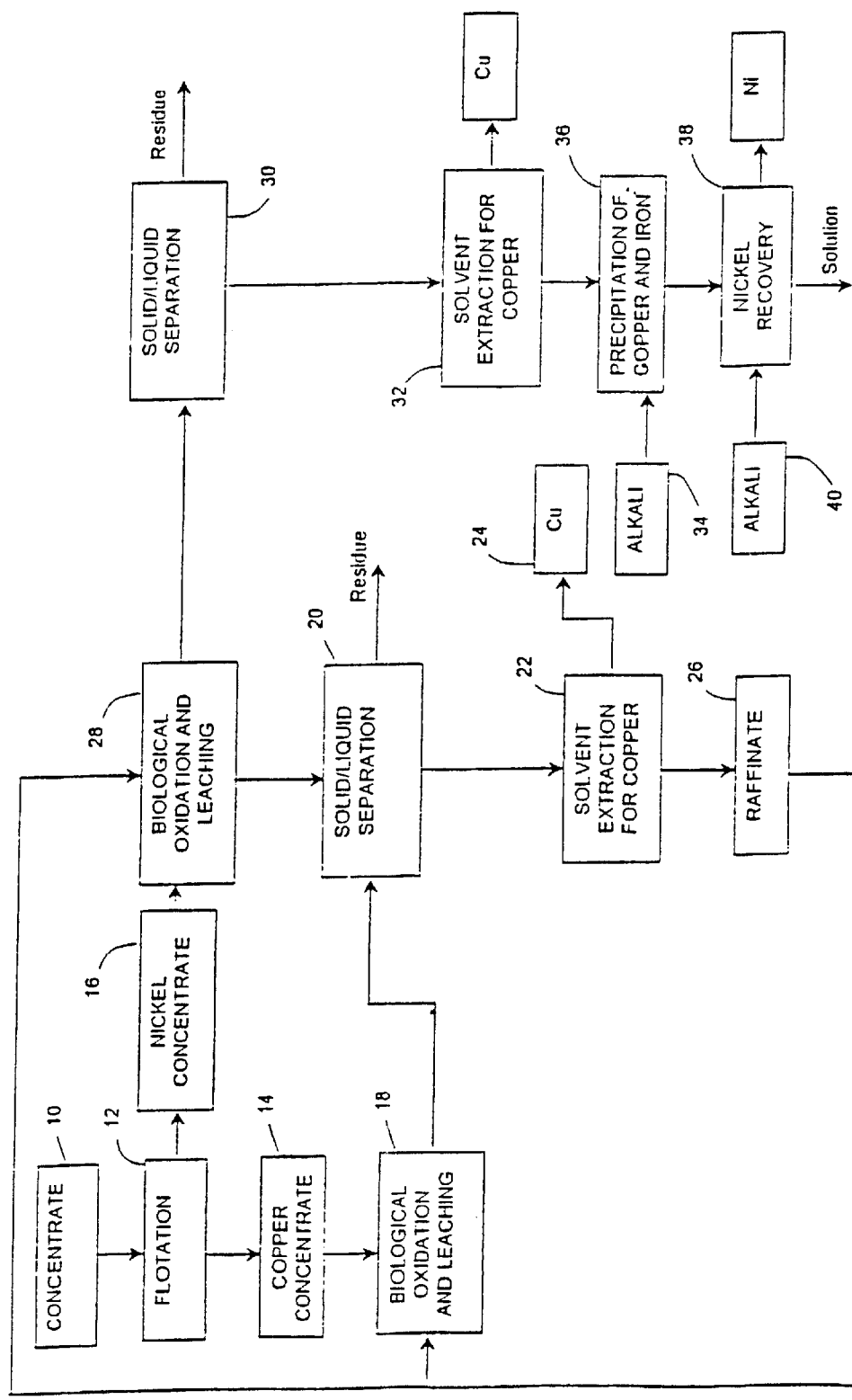

FIG. 1 of the accompanying drawings illustrates a process for the recovery of nickel and copper from a concentrate 10 which contains minerals of both metals. The concentrate 10 is subjected to a flotation process 12 which separates the concentrate into a first concentrate 14 which is substantially a copper concentrate, with some nickel usually in the form of pentlandite, and into a second concentrate 16 which is substantially a nickel concentrate, mainly pentlandite, with some copper present usually in the form of chalcopyrite.

The copper concentrate 14 is subjected to a biological oxidation and leaching step 18 and then to a solid/liquid separation step 20. This is followed by a solvent extraction phase 22 which produces copper 24 and a raffinate 26 which has a high acid content.

In the method of the aforementioned patent at least a portion of the raffinate is recycled to the biological oxidation step. In the present invention though substantially all of the raffinate 26 is recycled, at least a portion thereof going to the biological oxidation and leaching step 18.

The nickel concentrate 16 is subjected to a biological oxidation and leaching step 28. Acid is obtained from the remaining portion of the recycled raffinate 26. The step 28 is followed by a solid/liquid separation step 30 and the copper in solution is recovered by a solvent extraction step 32.

An alkali 34 such as lime, limestone or ammonia is used to precipitate iron and some copper 36, and the resulting solution is then treated for nickel recovery in a step 38. Again alkali 40 is added to the solution, at this stage, because ion exchange and solvent extraction for nickel requires a high pH.

After the nickel recovery the solution has no free acid and the solution is not recycled to the biological oxidation stages. It may be recycled for solution balance or it may be used as wash water in the solid/liquid separation steps 20 and 30.

A significant advantage of this process is that a substantial saving in sulphuric acid is achieved by recycling the raffinate to the stages 18 and 28.

The biological oxidation steps 18 and 28 are preferably conducted at elevated temperatures of the order of from 65° C. to 80° C. so that thermophilic archaea such as Sulfolobus are active and chalcopyrite is dissolved.

Figure 2:
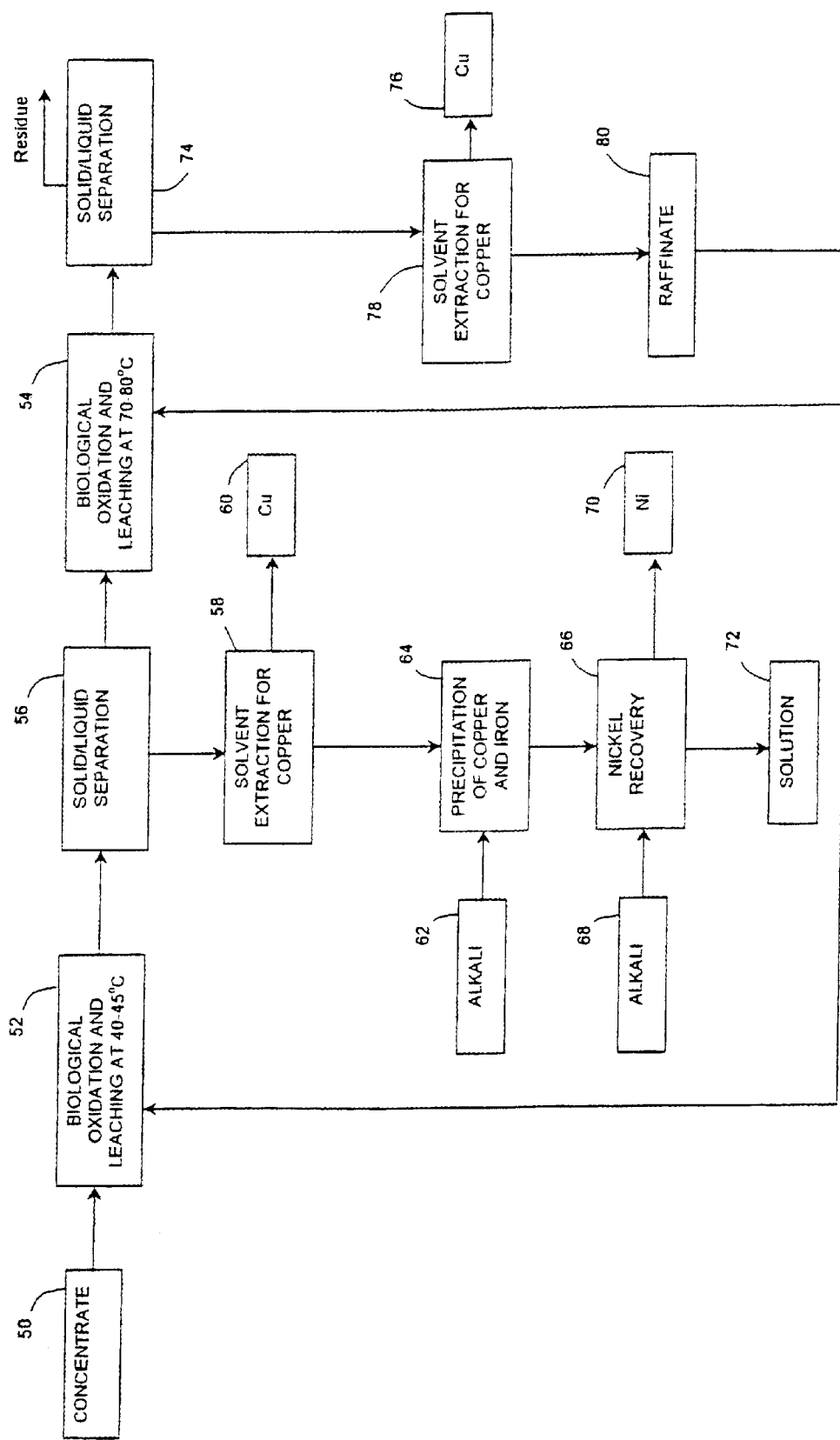

FIG. 2 illustrates a second embodiment of the process of the invention.

A concentrate 50 which contains minerals of nickel and copper is subjected to two biological oxidation steps 52 and 54 which are carried out sequentially i.e. in series, thereby producing a leach solution which contains most of the nickel and a small quantity of copper, and another leach solution which contains most of the copper and a small quantity of nickel.

In the step 52 biological oxidation is conducted using mesophiles at a moderate temperature of the order of 40° C. to 45° C., or moderate thermophiles at a temperature of 45° C. to 55° C. Nickel in the form of pentlandite is dissolved as nickel. Some copper is also dissolved. The leach solution is subjected to a solid/liquid separation step 56 and the resulting solution is treated with a solvent (58) for extracting copper 60. Alkali 62, in the form of lime, limestone or ammonia is then added to the solution to precipitate copper and iron (64) and the resulting solution is subjected to nickel recovery 66 after alkali 68 is added. After the nickel 70 has been extracted the remaining solution 72 is not suitable for recycling for acid content but, as has been described hereinbefore, can be recycled for solution balance.

The second biological oxidation step 54 is carried out at an elevated temperature of the order of 70° C. to 85° C. using thermophiles. Copper in the form of chalcopyrite is dissolved to give a leach solution of copper sulphate with a small quantity of nickel sulphate. The solution is subjected to a solid/liquid separation step 74 and thereafter copper 76 is recovered by means of a solvent extraction phase 78. The resulting raffinate 80 is high in sulphuric acid and, as is the case with the FIG. 1 embodiment, is recycled to one or both of the oxidation steps 52 and 54. Thus the acid is recovered.

In both embodiments the sulphuric acid in the raffinate can be recovered by recycling the raffinate to the biological oxidation and leaching step. This results in a significant cost saving.

What is claimed is:

1. A process for recovering nickel and copper from a concentrate which includes the steps of:
    (a) biologically leaching at a temperature of from 40° C. to 55° C. predominantly nickel from the concentrate into solution;
    (b) recovering nickel from said solution produced in step (a) by solvent extraction;
    (c) biologically leaching at a temperature in excess of 65° C. predominantly copper, in the form of a chalcopyrite, from said concentrate into solution; and
    (d) recovering copper and a raffinate, which contains sulfuric acid, from said solution produced in step (c) by solvent extraction.

2. The process according to claim 1 further including recycling to step (a) at least a portion of the raffinate, which contains sulfuric acid, which is produced in step (d).

3. The process according to claim 1 further including extracting copper from said solution produced in step (a) before carrying out step (b).

4. The process according to claim 1 wherein biologically leaching in (a) is carried out at a temperature of from 40° C. to 45° C. using mesophilic bacteria.

5. The process according to claim 1 wherein biologically leaching in (a) is carried out at a temperature from 40° C. to 55° C. using moderate thermotolerant bacteria.

6. The process according to claim 1 further including dissolving pentlandite as nickel into solution in step (a).

7. The process according to claim 1 wherein biologically leaching in (c) is carried out at a temperature of from 65° C. to 85° C. using thermophilic bacteria.

* * * * *